Jan. 17, 1961 E. W. GIEBEL 2,968,395
WINDSHIELD SHIPPING CARTON
Filed Jan. 28, 1959 4 Sheets-Sheet 1
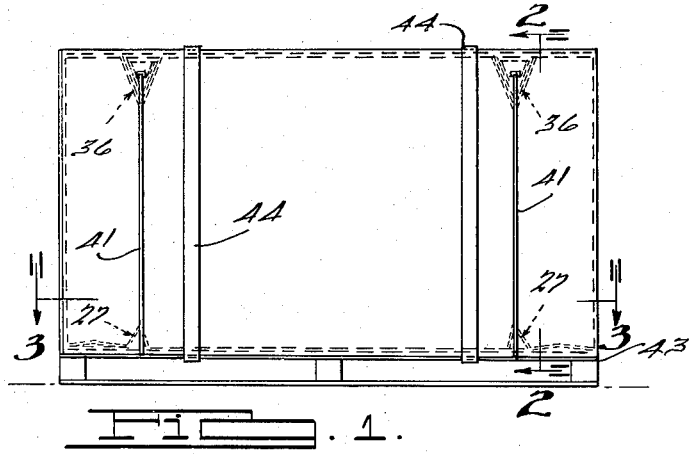
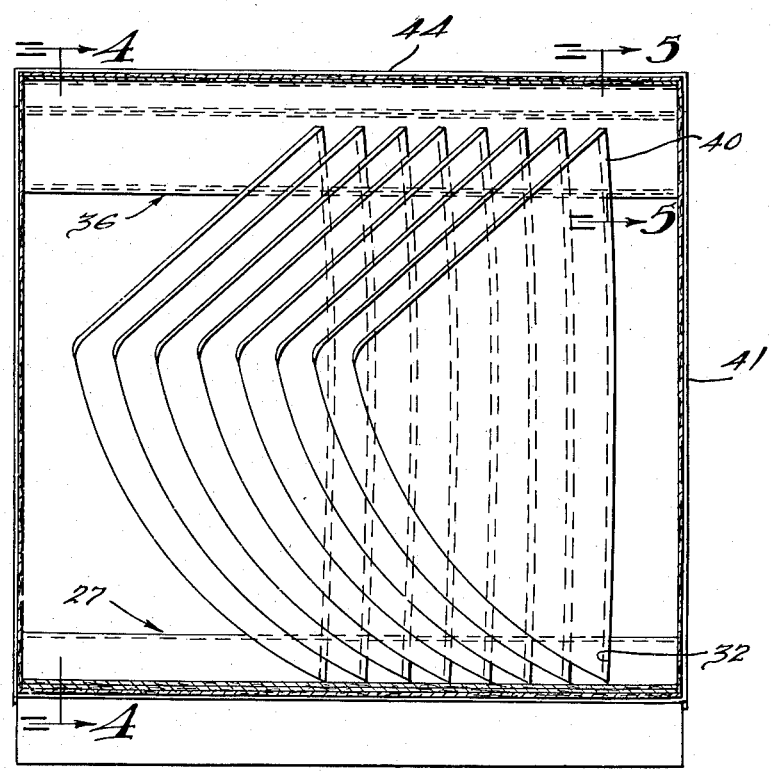
INVENTOR.
Ernest W. Giebel.
BY
Harness, Dickey & Pierce
ATTORNEYS.

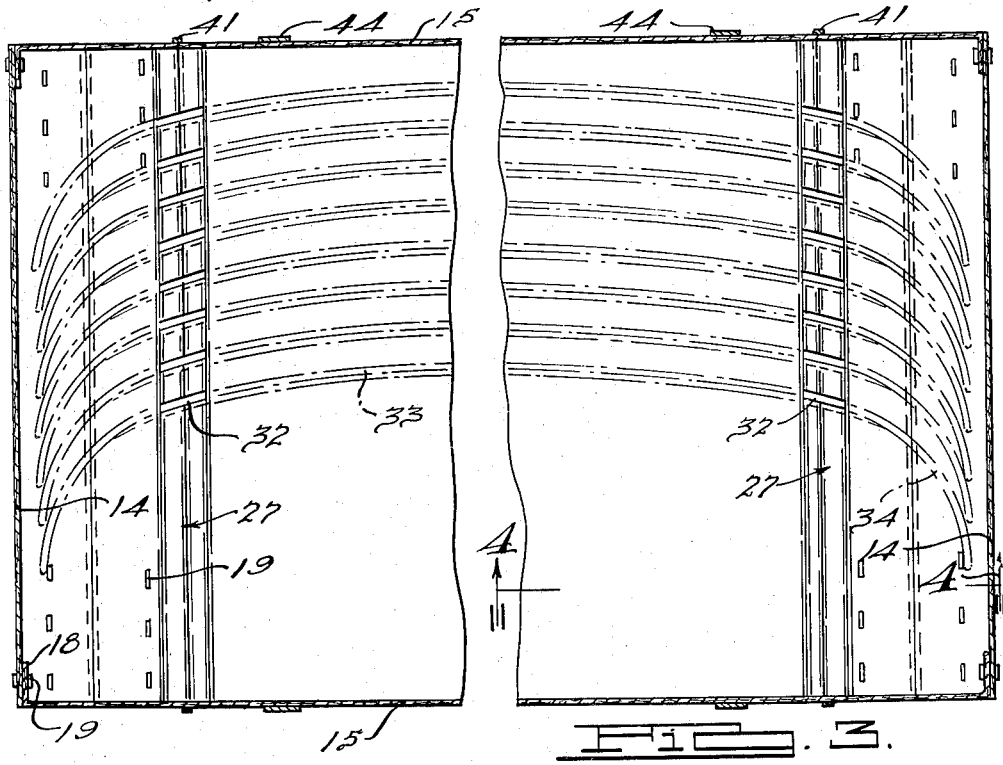
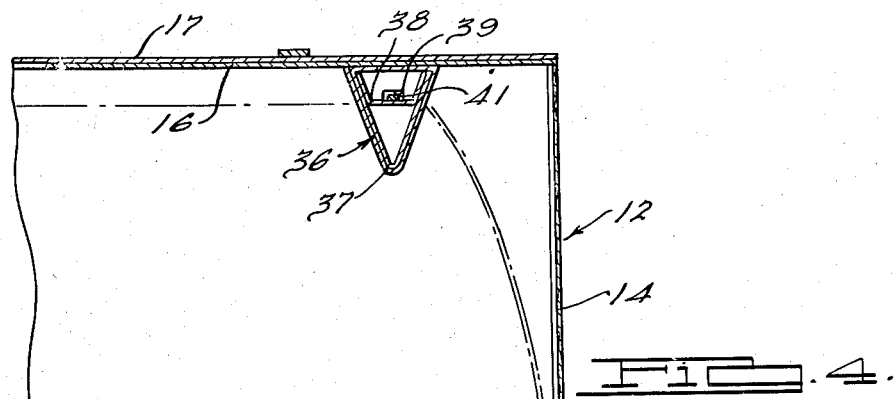
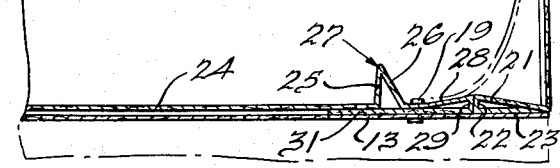

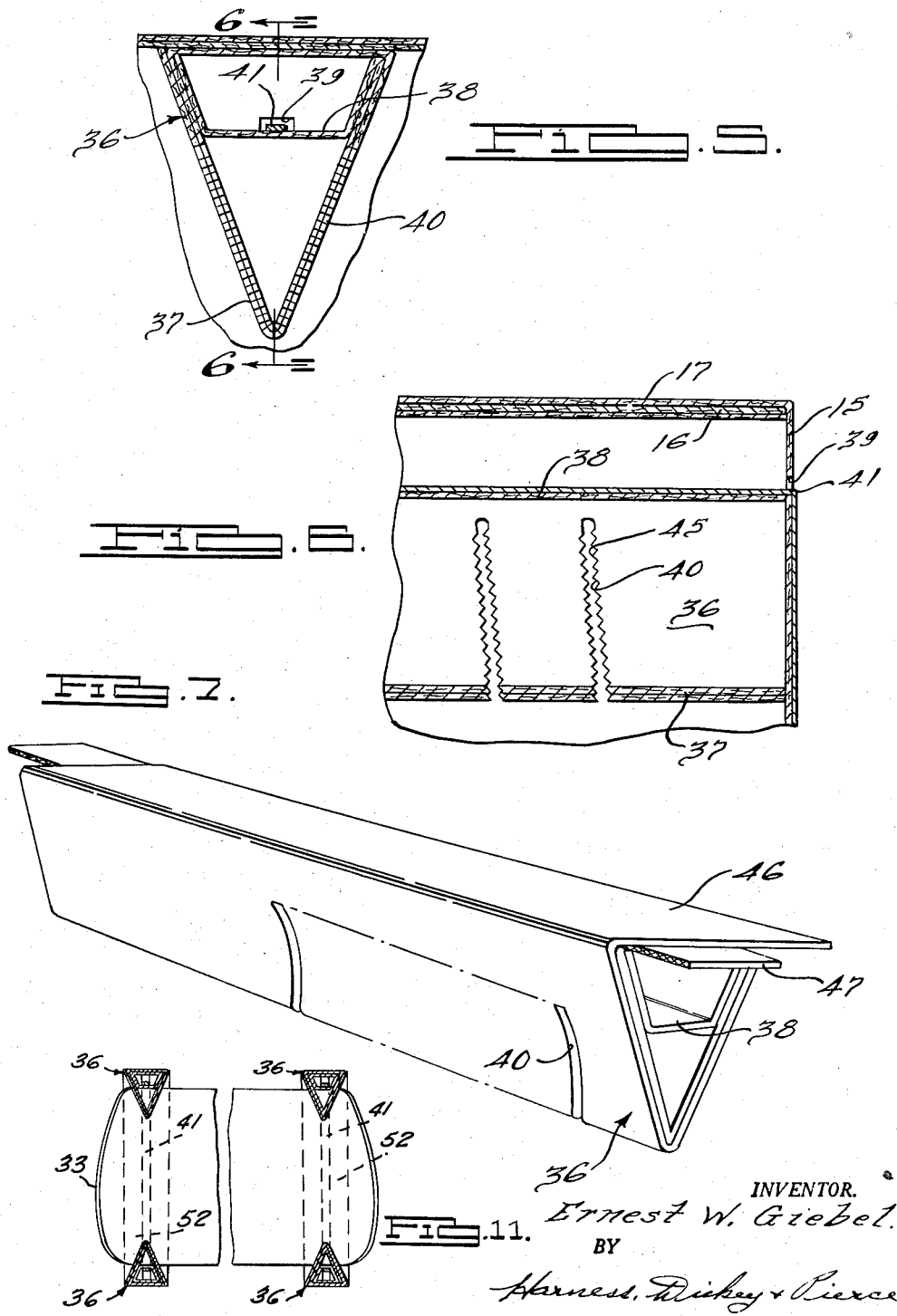

Jan. 17, 1961        E. W. GIEBEL        2,968,395
WINDSHIELD SHIPPING CARTON
Filed Jan. 28, 1959
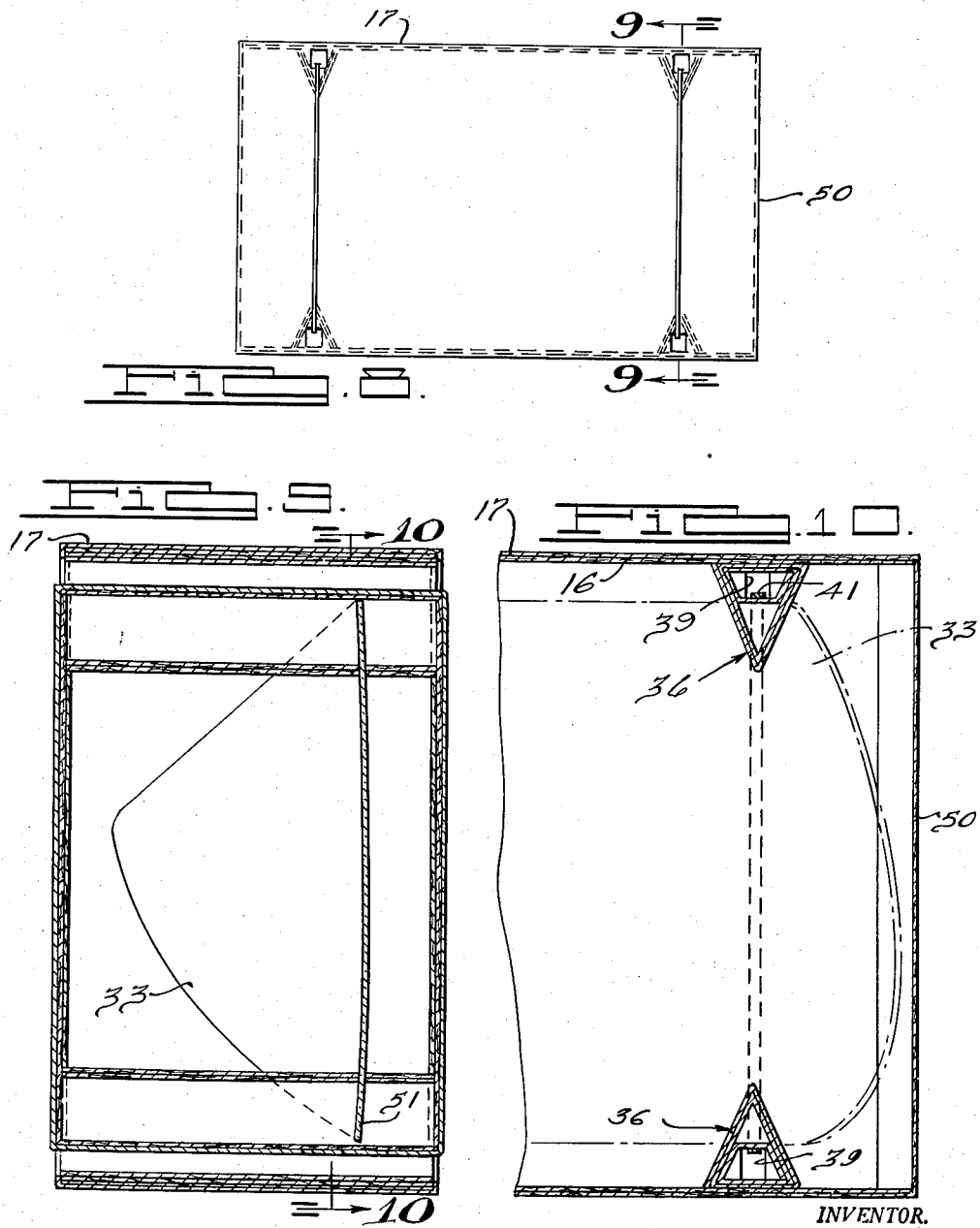
INVENTOR.
*Ernest W. Giebel.*
BY
*Harness, Dickey & Pierce*
ATTORNEYS.

United States Patent Office 2,968,395
Patented Jan. 17, 1961

2,968,395
WINDSHIELD SHIPPING CARTON

Ernest W. Giebel, Monroe, Mich., assignor, by mesne assignments, to Union Bag-Camp Paper Corporation, New York, N.Y., a corporation of Virginia Filed Jan. 28, 1959, Ser. No. 789,566

14 Claims. (Cl. 206—62)

This invention relates to cartons for storing and transporting windshields, and particularly to a carton for storing and shipping one or a plurality of windshields or rear vehicle windows of the wrap-around type.

Difficulty has been experienced when storing, transporting and handling the wrap-around type of windshield and rear window of a vehicle body because of the area occupied thereby due to the rearwardly extending side portions which are disposed substantially at right angles to the front face thereof. When a plurality of the windshields or rear windows are to be mounted in the carton, a false bottom is preferably provided therein having near each edge an upwardly and downwardly extending rib portion near each end having a plurality of laterally disposed slots therein for receiving the bottom edges of the windshields for spacing them a predetermined distance apart. When the word "windshield" is used herein, it is to be understood that rear windows and like articles of substantial width and turned back ends are to be included. The windshields are mounted in a vertical position and not at the angular position, as when secured in the body of a vehicle. A sheet of box board is rolled to provide a pair of double wall triangular braces, one of the apexes of which has slots disposed thereacross for receiving the top edges of the windshields for spacing them a predetermined distance apart near the ends of the carton. A laterally extending portion is provided within the triangular braces which rests upon the top edges of the windshields to protect the edge against the direct pressure of banding strips which extend thereacross. The strips extend through the side walls of the carton and are secured about the bottom thereof to rigidly maintain each windshield in predetermined relation to each other and the carton walls. Thereafter, the top end flaps and the top side flaps are folded over each other and glued together in the usual manner, and two or more banding strips are applied thereto directly or about the top platform of a pallet to further secure the carton against damage. A similar arrangement is employed when a single windshield is to be mounted for shipment within a carton, and may be altered to include four of the triangular bracing members, two at the top and two at the bottom near each end, one above the other provided with slots for receiving the top and bottom edges of the windshield or a plurality of slots if a plurality of windshields are to be shipped.

Accordingly, the main objects of the invention are to provide triangular braces at the bottom and top of a carton having slots therein in which a windshield or rear window is supported; to provide a reinforcing bottom for a carton having angular shape projections at each end containing slots for receiving the bottom edge of a plurality of windshields for spacing them a predetermined distance apart when retained in vertical position by top spacing elements having slots which receive the top edges thereof to support one or a plurality of windshields within a carton through the use of slotted triangular bracing elements which are bonded together through the side of the carton to maintain the windshield in a predetermined unit relation and in general to provide a carton with reinforcing and bracing elements which retain one or a plurality of windshields in predetermined relation therein, all of which is simple in construction and economical to manufacture and use.

Other objects and features of novelty of the invention will be specifically pointed out or will become apparent when referring for a better understanding of the invention to the following description taken in conjunction with the accompanying drawings wherein:

Figure 1 is a view in side elevation of a carton containing a plurality of windshields or rear windows secured in unit relation and to a pallet by reinforcing bonds;

Fig. 2 is an enlarged sectional view of the structure illustrated in Fig. 1, taken on the line 2—2 thereof;

Fig. 3 is an enlarged broken sectional view of the structure illustrated in Fig. 1, taken on the line 3—3 thereof;

Fig. 4 is a sectional view of the structure illustrated in Fig. 3, taken on the line 4—4 thereof;

Fig. 5 is an enlarged sectional view of the structure illustrated in Fig. 2, taken on the line 5—5 thereof;

Fig. 6 is a sectional view of the structure illustrated in Fig. 5, taken on the line 6—6 thereof;

Fig. 7 is a perspective view of the separate securing element employed in the structure of Figs. 1-4.

Fig. 8 is a view of the structure similar to that illustrated in Fig. 1, showing a modified form thereof;

Fig. 9 is an enlarged sectional view of the structure illustrated in Fig. 8, taken on the line 9—9 thereof;

Fig. 10 is a view of the structure illustrated in Fig. 9, taken on the line 10—10 thereof; and Fig. 11 is a view of structure, similar to that illustrated in Fig. 10, showing another form which the invention may assume.

Referring to Figs. 1-7, a carton 12 is illustrated having a bottom wall 13, end walls 14 and side walls 15. Flaps 16 on the end walls 14 are first folded in and then flaps 17 on the side walls 15 are folded over the flaps 16 to enclose the carton. The sides 15 and the ends 14 are disposed in extension of the bottom panel 13 and are bent upwardly and secured together at the corners when the inwardly extending flanges 18 on the side walls are secured to the end walls by the staples 19. The end walls 14 are preferably separate elements having an inwardly extending web portion 21, a downwardly extending portion 22, and a reverse portion 23 forming a raised triangular shaped reinforcing rib. The triangular ribs are secured to the body portions by a plurality of staples 19, as illustrated more clearly in Fig. 3. The bottom 13 is reinforced by a panel 24 having near each end an upstanding web 25 which is connected to a downwardly extending web 26 forming triangular reinforcing portions 27. A web 28 slopes upwardly from the web 26 to the height of the web 21 on the end panels 14 supported by a vertical section 29 and formed into a triangle by a reversely bent portion 31 which extends beneath the reinforcing triangular portion 27. The web 28 is secured to the reversely bent portion 31 by a plurality of the staples 19. The reinforcing portion 27 has laterally disposed slots 32 for receiving the bottom edge of a windshield or rear window 33 with the main portion thereof disposed upwardly in a vertical plane. The outer bent edge portions 34 of the windshield extend rearwardly from the front bottom edge which rests on the sloping web 28. A spacing and reinforcing element 36 is of triangular section having double wall thickness forming the apex portion 37 and with a channel portion 38 on the inner side. Slots extend inwardly of the apex portion 37 substantially in alignment with the slots in the reinforcing portion 27 for receiving the upper ends of the windshield or rear window which abut against the web of the channel portion 38. Through apertures 39 in the side walls 15 a steel banding strip 41 is passed and extended along both sides and across the bottom to securely maintain the side walls, bottom and reinforcing elements 27 and 36 in fixed predetermined relation to the plurality of windshields or rear windows which are mounted within the carton. As illustrated in Figs. 1 and 2 the end flaps 16 are folded over the reinforcing elements 36 and covered by the side flaps 17 which are glued thereto. The carton may be mounted directly upon a pallet 43 of conventional form, as illustrated in Figs. 1 and 2. A pair of steel bands 44 are then passed around the carton and the top platform portion of the pallet to secure the carton thereto and further reinforce the carton since it is securely fixed to the pallet. The reinforcing element is illustrated more specifically in Figs. 5, 6 and 7 as being formed to provide the inner channel portion 38, then wound therearound to produce the triangular element 36 having the apex portion 37. The apex portion 37 contains the slot or slots 40 for receiving the top edge of one or a plurality of windshields or rear windows of the wrap-around type. As illustrated in Fig. 6, the slot or slots are die-cut to have teeth 45 so as to obtain a firm grip with the glass surface. In Fig. 7 it will be noted that the slots 40 are of arcuate shape when the top edge of the glass is formed arcuately to blend in with the roof of the vehicle. Preferably, the board employed in the construction of the carton and the reinforcing bottom portions and top elements are made of corrugated type for lightness, strength and durability. In this arrangement it will be noted that a top web 46 is provided on the top face of the reinforcing element 36, while the web across the mouth of the channel 38 is extended to form flaps 47 at each end for attaching and reinforcing purposes.

Referring to Fig. 8, a further form of the invention is illustrated that wherein a single windshield or rear window 33 is to be supported. In this arrangement a carton 50 of conventional form has four reinforcing elements 36 mounted therein, one at the top and one at the bottom at each end of the carton. Each of the elements contains a slot 51 for receiving the bottom and top edges of the windshield or rear window, after which the banding strips 41 are applied through the apertures 39 in the side walls at the ends of each of the four reinforcing element 36. The bands tie the reinforcing elements to the sides and the windshield or window in fixed relation to each other. Thereafter, the end flaps 16 and side flaps 17 are folded over the top of the carton and glued or otherwise secured together. The single windshield or rear window in the carton is light in weight and can be readily handled without having the carton secured to a pallet. The pallet is employed when additional strength is required to support a plurality of windshields in the carton so that the carton may be handled by a pick-up truck.

Various combinations of the disclosed elements may be utilized for supporting the glass panels for forming wrap-around windshields and rear windows of a vehicle body. For example, the top and bottom of the carton or container may be omitted and the side and end walls secured directly to a pallet. In some instances, as illustrated in Fig. 11, the container may be entirely eliminated and the glass panels are bound together by four slotted supporting elements 36 and bands 41 which may pass through and extend along the face of the side panels or strips of paperboard 52 disposed at the ends of the elements 36. Thus, one or a plurality of the glass panels may be safely stored or shipped when protected against damage by the supporting members alone or in unit fixed relation with a container.

What is claimed is:

1. A container for supporting a wrap-around windshield, at least four reinforcing elements having slots extending inwardly from the facing side of one edge to a web disposed transversely across the interior, a windshield having bottom and top edges extending into a slot in each of said reinforcing elements and retained in substantially vertical position, and bands engaging said elements and resting upon the webs thereof and extending through apertures in and along the exterior of the container and binding the reinforcing elements to the windshields in firm fixed relation within the container.

2. Elements supporting glass panels in parallel spaced apart relation comprising a plurality of elongated tubular supporting elements each having an elongated web extending therethrough in spaced relation from the walls thereof, each of said elements being provided with spaced transverse slots in one side thereof terminating adjacent to the plane of said web, a plurality of glass panels having opposite edges, the opposite edges of the glass panels being disposed in said slots in engagement with one side of said webs to maintain the panels in spaced substantially parallel relation to each other, and bands extending through pairs of said elements on opposite sides of said glass panels and engaging the other sides of said webs to secure the elements to the glass panels.

3. A container having a plurality of glass panels supported therein comprising a container having sides and a bottom, said bottom being provided with raised ridges containing slots, a panel having opposite edges, one of the edges of the panel being disposed in a slot in each of said raised ridges, said bottom having an elongated web extending parallel to each of said raised ridges on the side thereof furthest removed from the other ridge, each of said webs sloping upwardly and away from the ridge adjacent thereto and engaging a curved portion of said edge of the panel, a pair of hollow tubular elements having an interior partition and transverse slots therein extending substantially to the depth of the interior partition, the other edge of said panel being disposed in a slot of each of said elements and engaging one side of said interior partitions, and reinforcing bands extending through said elements and along the sides and bottom of said container to form a reinforced unit, said bands engaging the other side of said interior partitions whereby said webs restrain said glass panels against sliding movement, the slots firmly maintain the panel against movement along the ridges and hollow elements and the interior partitions and bottom of the container prevent the panels from moving vertically.

4. A container supporting a curved window of a vehicle comprising side and end walls, two pairs of hollow elements within the container having slots therein for receiving the top and bottom edges of the window for maintaining it in vertical position within the container, webs associated with said elements on which the top and bottom edges are supported, and bands extending along and engaging the side of said webs opposite to the side engaged by said edges and along the side walls of the container for securing the window to said elements and container in unit relation therewith.

5. A container having a plurality of glass panels supported therein comprising a container having sides and a bottom, said bottom being provided with elongated raised ridges extending across opposite ends thereof, each of said ridges containing transverse slots aligned with corresponding slots in the other ridge, a panel having opposite straight edges curved toward one another at the ends thereof, one of the edges of the panel being disposed in a slot in each of said raised ridges, said bottom having an elongated web extending parallel to each of said raised ridges on the side thereof furthest removed from the other ridge, each of said webs sloping upwardly and away from the ridge adjacent thereto and engaging one of the curved portions at the end of said edge, a pair of hollow tubular elements each having an interior partition and transverse slots therein extending beyond the plane of the interior partition, the other edge of said panel being disposed in a slot in each of said elements and engaging one side of each of said interior partitions, each of the sides of the container adjacent to ends of the hollow elements having apertures therein aligned with the hollow elements, and reinforcing bands extending through said elements and said apertures in the sides and along the sides and bottom of said container to form a reinforced unit, said bands engaging the other side of each of said interior partitions whereby said webs restrain said glass panel against sliding movement perpendicular to the ridges, the slots firmly maintain the panel against movement along the ridges and hollow elements and the interior partitions and bottom of the container prevent the panels from moving vertically.

6. A container for supporting a plurality of glass panels supported therein comprising sides and a bottom, said bottom being provided with elongated raised ridges extending across opposite ends thereof, each of said ridges containing transverse slots aligned with corresponding slots in the other ridge, a panel having opposite straight edges curved toward one another at the ends thereof, one of the edges of the panel being disposed in a slot in each of said raised ridges, said bottom having an elongated web extending parallel to each of said raised ridges on the side thereof furthest removed from the other ridge, each of said webs sloping upwardly and away from the ridge adjacent thereto and engaging one of the curved portions at the end of said edge, whereby the glass panel is retained against movement along the ridges by said slots, and upwardly curved portions at the ends of the bottom edge of the panel rest on said upwardly sloping web so that the web restrains the panel against sliding movement perpendicular to the ridges.

7. In combination, a paperboard carton having a bottom, side and end walls, fragile tubular elements within said carton at the top and bottom thereof extending between the side walls and located near the end walls, a panel disposed within said carton having top and bottom edges, each of said elements having transverse slots therein and an elongated web extending therethrough, the top edge of the panel being disposed within a slot in each of the elements at the top of the carton and the bottom edge of the panel being disposed in a slot in each of the elements at the bottom of the panel with each edge engaging one side of the web adjacent thereto, reinforcing bands extending through said elements and about said side walls for securing the elements and panels in unit relation, said bands engaging the other side of each web in the elements through which they extend.

8. A carton receiving and supporting a plurality of wrap-around windshields comprising a bottom panel, two side walls and two end walls, said end walls having a triangular portion at the lower end thereof secured to the inner surface of the bottom panel, a reinforcing bottom sheet on the bottom panel having triangular portions at the ends abutting the triangular portions of the end walls, said reinforcing sheet having triangular ribs extending between the side walls inwardly of the triangular portions at the ends thereof, said triangular ribs containing a plurality of transverse slots, a plurality of wrap-around windshields within the carton each having one edge within a slot in each of said triangular ribs with the curved portions of the edge engaging the triangular portions of the bottom sheet, a pair of reinforcing members of triangular shape extending between said side walls and having a plurality of transverse slots through one apex thereof terminating at a web extending across the interior thereof against which the opposite edge of each of the windshields abut when extending into said last-named slots to be retained substantially in a vertical plane, and banding straps extending across the bottom and sides of the carton and through said reinforcing members along the side of said web opposite to the side thereof engaged by the edges of the windshields to maintain the reinforcing members, sides and windshields in unit relation 9. A container supporting a wrap-around curved panel in the form of a rear window or windshield comprising at least four elongated reinforcing elements having transverse slots extending inwardly from one edge and an elongated web disposed transversely across the interior of the elements, the container having end walls extending across the ends of said elements, a wrap-around curved panel within the container having opposite edges supported within said slots and on one side of said interior webs, and bands extending through the elements engaging the other side of said webs and extending through apertures in said end walls and along said end walls for binding the reinforcing elements to the curved panel in firm relation within the container.

10. A container for supporting a glass panel, such as a wrap-around windshield or rear window of a vehicle comprising a container having at least two side walls and two end walls, a glass panel having opposite edges within said container, two pairs of elongated hollow supporting elements having transverse slots therein receiving the opposite edges of said glass panel and maintaining the panel in substantially vertical position within the container, each of said hollow supporting elements having a flat web extending longitudinally therethrough with one side of the web engaging one of the opposite edges of said glass panel to support the panel within said slots, and bands extending through at least some of said elements and engaging the other side of said web and portions of said container to secure said panel, elements and container in unit relation.

11. Elements supporting a glass panel in substantially vertical position comprising a plurality of elongated hollow transversely slotted supporting elements having a partition extending therethrough, a glass panel having opposite edges, the opposite edges of said glass panel being disposed in said slots and engaging one side of said partition, walls engaging the ends of said elements, and banding means extending through said elements and said walls and engaging the other side of said partition and outer sides of the walls to secure the walls, elements and glass panel in fixed relation to each other.

12. A paperboard packaging and cushioning element adapted to be placed about the edge of a curved windshield or rear window panel of an automobile having the opposite ends thereof rearwardly extended, said element comprising a longitudinally extending hollow portion having a transverse slot extending inwardly thereof, a longitudinally extending web adjacent to said slotted hollow portion providing a continuous uninterrupted surface sloping upwardly from a point near the bottom of one end of said slot, and web means connected to said sloping web extending downwardly from the longitudinal edge thereof furthest removed from the hollow portion to provide support for said edge of the sloping web, one edge of a panel having curved ends being adapted to fit within said slot with the adjacent curved end adapted to rest on top of the sloping web in a manner to prevent the panel from moving transversely of the element in a direction toward the sloping web.

13. A supporting element for a glass panel which is curved rearwardly at each end, said element being made from a pair of hollow tubular members disposed in side-by-side relationship, one of said tubular members having a transverse slot therein, the other tubular member having a sloping web providing a continuous uninterrupted surface extending outwardly and upwardly from a point near the bottom of one end of the slot in said first tubular member, and means for securing said tubular members in fixed relation to each other, one edge of the glass panel being adapted to fit in said slot with the adjacent curved portion of said one edge provided by the rearwardly extending end of the glass panel supported on the continuous uninterrupted surface of said sloping web in a manner to prevent the glass panel from moving transversely of the element in a direction toward the sloping web.

14. A supporting element for a glass panel which is curved rearwardly at each end, said element being made from a pair of paperboard hollow tubular members disposed in side-by-side relationship, one of said tubular members having a transverse slot therein, the other tubular member having a sloping web providing a continuous uninterrupted surface extending outwardly and upwardly from a point near the bottom of one end of the slot in said first tubular member, and means for securing said tubular members in fixed relation to each other, one edge of the glass panel being adapted to fit in said slot with the adjacent curved portion of said one edge provided by the rearwardly extending end of the glass panel supported on the continuous uninterrupted surface of said sloping web in a manner to prevent the glass panel from moving transversely of the element in a direction toward the sloping web.

References Cited in the file of this patent

UNITED STATES PATENTS

| | | |
|---|---|---|
| 2,337,468 | Hilger | Dec. 21, 1943 |
| 2,741,362 | Cortright | Apr. 10, 1956 |
| 2,743,010 | Koester | Apr. 24, 1956 |
| 2,750,032 | Laird | June 12, 1956 |
| 2,776,745 | Van Antwerpen | Jan. 8, 1957 |
| 2,888,134 | Van Antwerpen | May 26, 1959 |